United States Patent [19]

Wristers et al.

[11] 3,926,848

[45] Dec. 16, 1975

[54] PROCESS FOR INCREASING ACTIVITY OF HEAVY TRANSITION METAL HALIDE STEREOSPECIFIC CATALYSTS

[75] Inventors: Harry Jan Wristers; Herschel Claude Williams, both of Baytown, Tex.

[73] Assignee: Exxon Research & Engineering Co., Linden, N.J.

[22] Filed: Apr. 19, 1973

[21] Appl. No.: 352,666

[52] U.S. Cl.......... 252/442; 252/429 A; 252/429 C; 260/93.7; 260/94.9 B; 260/94.9 C; 260/94.9 E; 423/492
[51] Int. Cl.$^2$.. B01J 27/10; C08F 4/00; C08F 11/06
[58] Field of Search.... 252/429 A, 442, 441, 429 C; 423/492; 260/93.7

[56] References Cited
UNITED STATES PATENTS

| | | | |
|---|---|---|---|
| 3,010,787 | 11/1961 | Tornquist | 252/429 A |
| 3,032,513 | 5/1962 | Tornquist et al. | 252/442 |
| 3,063,798 | 11/1962 | Langer, Jr. et al. | 423/492 |
| 3,130,003 | 4/1964 | Tornquist et al. | 252/429 A |
| 3,130,004 | 4/1964 | Siggel et al. | 423/492 |
| 3,130,005 | 4/1964 | Siggel et al. | 423/492 |
| 3,420,809 | 1/1969 | Tornquist | 252/442 |
| 3,424,774 | 1/1969 | Tornquist | 252/429 A |
| 3,531,420 | 9/1970 | Tornquist | 252/442 |
| 3,562,239 | 2/1971 | Jong et al. | 252/429 A |
| 3,640,987 | 2/1972 | Phung et al. | 252/441 |
| 3,701,763 | 10/1972 | Wada et al. | 252/429 C |
| 3,825,524 | 7/1974 | Wada et al. | 252/429 C |
| 3,850,899 | 11/1974 | Wada et al. | 252/429 C |

*Primary Examiner*—Winston A. Douglas
*Assistant Examiner*—P. E. Konopka
*Attorney, Agent, or Firm*—David A. Roth

[57] ABSTRACT

Ziegler-Natta transition metal catalysts, especially physical-energy-activated cocrystallized metal halide catalysts such as TiCl$_3$.⅓ AlCl$_3$ catalysts obtained with commercial ball milling techniques can be treated to be unexpectedly more active and more stereospecific. The process comprises heating the Ziegler-Natta catalysts, e.g. the physical-energy-activated, e.g. ball-milled, catalyst in certain inert solvents above the boiling point of the solvents for certain time intervals and at certain specified temperatures.

9 Claims, No Drawings

PROCESS FOR INCREASING ACTIVITY OF HEAVY TRANSITION METAL HALIDE STEREOSPECIFIC CATALYSTS

BACKGROUND OF THE INVENTION

Field of the Invention.

The invention relates to highly significant improvements accomplished by relatively simple processes performed on commercial type Ziegler-Natta transition metal catalysts, preferably physical-energy-activated cocrystallized metal halide catalysts, e.g. ball-milled, cocrystallized $TiCl_3 \cdot \frac{1}{3} AlCl_3$ stereospecific polymerization catalysts.

A very important, commercially available, stereospecific polymerization catalyst is produced by reducing titanium tetrachloride with aluminum or aluminum-containing compounds to produce a cocrystallized $TiCl_3 \cdot \frac{1}{3} AlCl_3$. This crystalline material is usually washed with various solvents such as benzene to make sure that any unreacted catalyst poison such as $TiCl_4$ is removed.

The washed, reduced catalyst is then dried and ball-milled in its dry state very intensely for several hours in order to activate the catalyst to a high degree of effectiveness. Once the initial catalyst has been formed, it is not contacted with solvent until after the ball-milling step, since the presence of solvent during ball-milling will interfere with the increase in surface area, which must take effect in the catalyst's crystallographic structure.

Aluminum reduced $TiCl_4$ is described in U.S. Pat. Nos. 3,032,511; 3,128,252; and 3,252,960. Ball-milling of the above reduced catalyst is described in U.S. Pat. No. 3,032,510.

CROSS REFERENCE TO RELATED APPLICATIONS

This application is not directly related to any other application of the present assignees and is an improvement over inventions which have been disclosed and patented in the above-cited patents, which are hereby incorporated by reference in their entirety.

SUMMARY OF THE INVENTION

A process for obtaining an improved stereospecific catalyst and a novel catalyst composition per se, in which a Ziegler-Natta catalyst, especially physically-activated cocrystallized metal halide catalyst, e.g. ball-milled $TiCl_3 \cdot \frac{1}{3} AlCl_3$ stereospecific catalyst, is treated with specific solvents, e.g. benzene, under specific conditions of temperature and time to produce a vastly improved catalyst. Trace catalyst poisons are removed by this technique.

DETAILED DESCRIPTION OF THE INVENTION WITH PREFERRED EMBODIMENTS

It has been found and forms the substance of this invention that highly improved Ziegler-Natta catalysts, especially cocrystallized metal halides, e.g. ball-milled $TiCl_3 \cdot \frac{1}{3} AlCl_3$ catalyst, can be prepared utilizing a technique which forms an important process facet of the invention hereof. The commercial preparation of the ball-milled catalyst generally involves the reduction of $TiCl_4$ with aluminum in a benzene solvent to obtain a cocrystallized $TiCl_3 \cdot \frac{1}{3} AlCl_3$ product followed by washing of the resulting, reduced co-crystallized catalyst with benzene. The term "co-crystallized" is well understood in the art as meaning a definite crystalline structure in which all the molecules are arranged in some fixed configuration, i.e. lattice structure. And $\frac{1}{3}$ of the $TiCl_3$ molecules in the lattice have been replaced with $AlCl_3$ atoms.

The benzene apparently removes some of the non-reacted $TiCl_4$ which is a polymerization catalyst poison. Additional improvement in removing the $TiCl_4$ from the $TiCl_3 \cdot \frac{1}{3} AlCl_3$ is also accomplished by heating the cocrystallized catalyst in warm solutions of solvents or extracting with repeated solvent treats. $AlCl_3$ is also removed by this treatment.

Thereafter, the cocrystallized catalyst is dried and subsequently physically energized by a suitable technique, such as ball-milling or the equivalent in the dry state, for extended periods in order to obtain important increases in surface area. These are quite significant in magnitude. This is a catalyst having an initial surface area of about 1 $M^2/gm$ will usually be increased in surface area by a factor of about 30 to achieve a commercially suitable polyolefin plastic catalyst. Sonic energy, for instance, can also be used to effect the requisite surfaceographic changes. The ball-milled catalyst is sold commercially and is widely used, after activation with a cocatalyst, for preparing high density polyethylene, isotactic polypropylene, and ethylene-propylene copolymers.

Great care is taken that no solvent is introduced into the presence of the catalyst during ball-milling or after ball-milling until polymerization, since it is believed that this would adversely affect catalyst activity and catalyst life.

It is theorized by the instant inventors that during the synthesis of the $TiCl_3 \cdot \frac{1}{3} AlCl_3$ catalyst some $TiCl_4$ becomes entrapped in the resulting cocrystallized catalyst crystals. This $TiCl_4$ is apparently occluded or insulated from Al reducing agent and from solvents, and complete reduction of the $TiCl_4$ does not occur.

It is known that $TiCl_4$ should be removed from the crystal lattice of the cocrystallized catalyst, since during activation with co-catalyst such as diethyl aluminum chloride or triethyl aluminum prior to polymerization, any residual $TiCl_4$ will be converted to a brown beta $TiCl_3$ by reduction. This latter crystal species of $TiCl_3$ is a polymerization catalyst, having a very low stereospecificity and very low activity.

Furthermore, the co-catalyst, which reduces the residual $TiCl_4$ is itself converted to a by-product, ethyl aluminum dichloride, which is also highly detrimental to catalyst activity.

Therefore, a great deal of effort to remove trace quantities of $TiCl_4$ from the polymerization catalyst has been exerted. None of these techniques, including solvent washing, have been effective.

In addition, as an additional feature and advantage of the invention, it is quite likely that the heat treatment with solvents also removes some $AlCl_3$. $AlCl_3$, exposed in a ball-milled catalyst, acts as a poison since it will react with cocatalysts such as $AlET_2Cl$, yielding $AlET Cl_2$, which is a catalyst poison, as pointed out above.

It has now been found by the present inventors and forms the substance of this invention that the activity of cocrystallized $TiCl_3 \cdot \frac{1}{3} AlCl_3$ catalyst can be greatly improved after ball-milling by special heat and solvent treatment. This treatment apparently effectively removes the $TiCl_4$ and $AlCl_3$ trace catalyst poisons which were trapped or occluded within the metal halide crystal lattice during co-crystallization.

It has been found and is a feature of the invention, that during the physical energy activation step, e.g. ball-milling, these trace catalyst poisons become physically exposed within the catalyst's crystal lattice, so that the special, novel solvent treatments now enables penetration within the crystalline interstices to remove the trace catalyst poisons, e.g. $TiCl_4$ and $AlCl_3$. These trace but toxic amounts of catalyst poisons have heretofore prevented the co-crystallized, ball-milled catalyst from attaining its maximum effectiveness.

It has been further found that highly selective solvents are necessary in order to achieve optimum results according to the invention. The most effective solvent is benzene, although heptane is the first preferred alternative. In general, the solvent treatment involves heat-soaking within a temperature range of about 80° to 195°C., preferably 90° to 170°C., and most preferably 100° to 160°C., for a time of about ½ to 60, preferably 5 to 40, and most preferably 10 to 35 minutes.

Generally, the heat-soaking requirements can be accomplished by heating the ball-milled catalyst in the presence of the solvent above the boiling point of the solvent. Preferably the simultaneous heat treating and exposure of co-crystallized catalyst to the solvent takes place within a closed container so that the vapor pressure of the solvent creates an internal pressure which also contributes to the effectiveness of the removal of the impurities and the consequent important improvement in catalyst properties.

Generally, from about 0.1 to 25 preferably 3 to 15, most preferably 6 to 12 weight percent of catalyst in solvent is treated in each heat soak activation.

In addition it is important to note as a feature of the invention that the heat soaking activation step described herein can be utilized to considerable advantage even before the physical-energy activation step in lieu of heat-soaking after the physical-energy activation.

Especially preferred is a process and catalyst resulting therefrom in which two heat-soaking activations are carried out; one before physical activation and one after.

The physical-energy activated catalysts are the especially preferred species for the purpose of this invention, because they show remarkable orders of improvement. Nevertheless, some improvements can be obtained in other type Ziegler-Natta plastic polymer catalysts, such as those prepared by the reduction of $TiCl_4$ by other reducing agents, e.g., metal alkyls.

Furthermore, the cocrystallized species is especially preferred, since it is commonly used commercially. However, transition metal halides which are substantially non-cocrystallized can also be used. For instance, $TiCl_3$ will show improvements when treated according to the techniques of the inventions.

In general, the physical activation, e.g. ball-milling referred to herein will be sufficient to increase the surface area of a suitable catalyst from about 3 to 50, preferably 5 to 50, and most preferably 25 to 30 fold. That will correspond to the same numerical units in square meters/foot.

Ziegler-Natta Transition metal catalysts as used herein are understood to be those as described by D. C. Feay, Chapter 15 in "Organic Chemistry of Synthetic High Polymers," R. W. Lenz, ed. Interscience Publ. New York, (1967).

It is to be noted that although co-crystallized $TiCl_3 \cdot \frac{1}{3} AlCl_3$ is the most preferred species for the purpose of the invention, other titanium halide-containing catalysts with varying amounts of aluminum halide can also be activated by this approach. Furthermore, the amounts of halide can be varied. For instance, $TiX_m \cdot n\, Al_3$ can be useful to state the proposition generically, where n varies from 0.01 to 5, preferably 0.1 to 3, and most preferably 0.3 to 1, where m can vary from 2 to 3.5, preferably 3 and above and X is a halide, preferably chloride.

Very generally from a generic sense, the preferred species of catalyst, e.g. cocrystallized physical-energy-activated metal halide catalysts, which can be improved by the process of the invention and which as a result thereof comprises a new class of catalyst compounds can be described as follows:

One component, which is cocrystallized according to well-known techniques in the art, is a reducible heavy metal compound such as halides, acetyl acetonates and the like of metals of Group IV through VI and VIII of the Periodic Table. Representative species of this class include: titanium, zirconium, vanadium, chromium, molybdenum and iron.

The other component which is cocrystallized is a Group II or III metal halide. Representative species of this class include: aluminum, zinc, magnesium, mercury, silver, tin, arsenic and the like.

Ball-milling is a preferred method of impacting the cocrystallized structure with physical energy adequate to impart significant changes in the surface area of the catalysts, particularly the cocrystallized catalyst compounds.

Nevertheless, it is understood that alternative but equivalent techniques are available. These include sonic energy devices and the like.

Thus, while the term "ball-milled" is used herein for convenience, it is to be understood that the means of impacting the physical energy is not important. It is only important that the catalyst be exposed to physical energy adequate to effect the surface area changes. For convenience, the cocrystallized catalyst with these crystallographic changes, i.e., the delta form of $TiCl_3$ will be referred to as the ball-milled catalyst.

The chlorides are the highly preferred halide species; and titanium is the preferred heavy metal component. Aluminum is the preferred Group II or III metal component of the cocrystallized catalyst.

Although benzene and heptane are especially preferred, other inert hydrocarbon solvents including $C_4$ to $C_{30}$ preferably $C_4$ to $C_{18}$ paraffins, cycloparaffin and aromatics can also be used as $TiCl_4$ and $AlCl_3$ removing solvents. Examples of such solvents include cyclopentane, heptane, octane, toluene and the like.

Scavengers for $TiCl_4$ and $AlCl_3$ can be present during the heat-soaking solvent activation of the invention. Included among such scavengers are aluminum alkyls, aluminum alkyl halides and other metal alkyls. But, no beneficial or detrimental results have yet been observed through the use of such scavengers.

While the invention has been specifically described and illustrated in terms of titanium chlorides as a preferred embodiment, it is to be understood from the above discussion that it is applicable to all transition metal halides which have been prepared by reducing such halide in its highest valence state to a lower valence state.

Included in such transition metal halides are vanadium chlorides, zirconium chlorides and the like.

The novel catalyst composition produced by the technique of invention is especially remarkable and advantageous since both catalyst activity and the quantity of heptane-insoluble polypropylene were improved simultaneously. Sometimes it is possible to increase catalyst activity alone or sometimes it is possible to increase the heptane insoluble content of polypropylene alone. But, at all times an improvement in one category is accompanied by a concomitant decrease in the other. Thus, under normal circumstance, an improvement in catalyst activity leads to a decrease in heptane insolubles while an improvement in heptane insolubles will lead to a loss of catalyst activity.

The technique of the invention is therefore greatly surprising in that respect.

Commercial installations for producing stereoregular polymers such as polypropylene and high density polyethylene are extremely large. The minimum size would probably run about 200,000,000 pounds and some of them are as large as 500,000,000 pounds. Given these enormous capacities, it can be seen that very small changes in catalyst activity and heptane insolubles have an enormous effect because of the large multiplier supplied by the enormous plant capacity.

Heptane insolubles are a particularly important area where large savings can be effected. Isotactic polypropylene, for example, is not soluble in heptane. Amorphous polypropylene is soluble in heptane. And, therefore, heptane is used as a technique to separate the amorphous, undesired polypropylene as well as ash and other components from the desired stereoregular polymer.

The heptane soluble portion along with inorganic residues, and some isotactic polypropylene, is often referred to as "reject" polypropylene in a polypropylene operation. It is readily apparent that any propylene that is polymerized to a reject type polypropylene is totally wasted.

Therefore, any improvement in the amount of heptane insoluble polypropylene no matter how small, has vast economic consequences. If the catalyst activity can be increased at the same time, then the effectiveness and the advantage of the invention are multiplied by logarithmic factors of significance.

Further, in addition to the obvious operating cost reduction, the practical effect is also to give additional effective reactor capacity, thus saving on capital investment.

Reactor fouling rates are reduced and a higher quality reactor copolymer can be produced.

Although it is known that the presence of $TiCl_4$ in a polymerization catalyst is detrimental and leads to lower activity and lower stereospecificity, the amount of $TiCl_4$ is so small since it is only present in trace quantities that it is very difficult to measure quantitatively the amount of $TiCl_4$ or other catalyst poison that has been extracted with the process of the invention.

Conventional analytical techniques such as neutron activation, chemical analysis, emission spectoscopy, UV spectra, X-ray defraction, mass spectras, etc., do not identify significant changes in the catalyst as a result of the extraction technique of the invention. Nevertheless, all the evidence strongly indicates that the presence of unreduced $TiCl_4$ is a cause of decreased catalyst activity. And the removal of these trace amounts utilizing the technique of the invention results in a greatly improved catalyst.

Although analytical techniques fail to show the trace quantities of the $TiCl_4$ or other poison, other approaches can be used to demonstrate the removal of poisonous trace species by the technique of the invention. Thus, it has been demonstrated that when the $TiCl_4$ has been extracted from the ball-milled catalyst according to the technique of the invention, the extraction solvent containing the poisonous species can be added to another conventional, untreated ball-milled catalyst, resulting in a severe diminution of activity and $C_7$ insolubles. The invention is further illustrated by the following examples.

In the examples which follow, several catalyst compositions and polymerizations utilizing them were carried out in accordance with the general techniques described below.

The solvent used in the heat treatment was added to thick-walled soda pop bottles (350 cc) and the specified amount of $AlEt_2Cl$ was added to the solvents. In cases where stirring was required, a magnetic stirring bar was added to the pop bottle. A weighted amount of catalyst was added to the solvent and the container was then capped. All operations were performed in an inert atmosphere.

The catalyst suspension was stirred outside the dry box in an oil bath and was heated to 100° C., whereupon the system was vented in order to remove the nitrogen atmosphere. The catalyst suspension was then heated to the specified temperature and maintained at the activation temperature for a specified period of time. After the activation step was completed, the bottle was allowed to cool in the oil bath to 60°C. and was then repressured with nitrogen to 1–3 psig.

The catalyst suspension was filtered in an inert atmosphere, washed with heptane, and dried under vacuum. The catalyst was tested for polymerization by conventional techniques (reaction conditions 65 ±0.1°C.; 765 ± 5 mm total pressure [$C_3^=$ and $C_7$ diluent]; 2 hrs. reaction time; 2 $AlEt_2Cl$:1 $TiCl_3$ mole ratio; 5–7 mmoles of $TiCl_3$ catalyst per 500 cc. of heptane polymerization diluent).

EXAMPLE 1

A series of four solvents, e.g. heptane, benzene, toluene and xylene, was tested on a commercially available ball-milled, cocrystallized $TiCl_3 \cdot \frac{1}{3}$ aluminum chloride catalyst obtained from Stauffer Chemical Company. The results are summarized below in Table I.

TABLE I

| Solvent | Activation of Catalyst-Effect of Particular Solvent[a] | | |
|---|---|---|---|
| | Catalyst Activity | Waxy Polymer % | $C_7$-Insolubles[b] % |
| Heptane | 49.9 | 2.1 | 94.6 |
| Benzene | 47.7 | 4.5 | 92.6 |
| Toluene | 35.3 | 4.7 | 91.9 |
| Xylene | 39.7 | 4.7 | 92.9 |
| Control | 34.4 | 5.1 | 91.9 |

[a]Activation Conditions: 10 gms of catalyst per 100 cc solvent, 1$AlEt_2Cl$: 1$TiCl_4$ mol ratio; 1 hr. at 100° C.
[b]Catalyst activity and $C_7$-insoluble data are for total polymer including waxy polymer.

The results data in Table I, as well as results data set forth in the other examples of this application, are for the total polymer, including the waxy polymer. In the polymer workup, the reaction mixture was added to two volumes of isopropyl alcohol, and after two hours of stirring was filtered.

The solid polymer powder obtained, which was weighed and checked for isotacticity, was usually 96 to 97.5% $C_7$-insoluble.

The filtrate, when evaporated had a waxy residue, which amounted to about two to five grams. The catalyst weight was subtracted from the residue to yield the quantity of waxy polymer, from which the per cent waxy polymer was calculated. The per cent $C_7$-insolubles obtained for the dry powder must be multiplied by the ratio of the (dry powder) to the (dry powder plus waxy polymer), to give the total $C_7$-insolubles for the total polymer.

Normally, the $C_7$-insoluble per cent of the dry polymer can be estimated by adding the waxy polymer per cent of the total polymer to the per cent $C_7$-insolubles of the total polymer. Thus, for the control run in Table I, the per cent $C_7$-insolubles of the dry powder was 97.0%.

As reported previously, the precision of determination of waxy polymer is lower than the precision of any of the tests. The precisions expressed in terms of standard deviation as per cent of the average, are for catalyst activity, per cent waxy polymer, and per cent $C_7$-insolubles, 1.44, 23.7, and 1.0 respectively.

As can further be seen from the above Table I, heptane and benzene had similar activation behavior but toluene and xylene caused hardly any change in properties. The boiling points of heptane and benzene are 98° and 80°C. respectively. The boiling points of toluene and xylene are 111° and 139° C. respectively.

Thus, the two diluents that were most effective in activating the catalyst according to the invention were heated above their boiling points. It has not been ascertained yet whether this is a significant factor.

It is theorized that the size of the solvent molecule is quite important. It must be small enough to penetrate into the interstices of the ball-milled, cocrystallized catalyst species and interact in some manner with trace quantities of catalyst poisons, such as $TiCl_4$. Possibly it acts as a solvating agent for $TiCl_4$ and $AlCl_3$ so that $TiCl_4$ and $AlCl_3$ are at least removed from the active catalyst sites.

EXAMPLE 2

In order to demonstrate the effect of temperature on catalyst activity according to the technique of the invention, a series of runs was carried out at different activation temperatures. The results are summarized below in Table II.

TABLE II

| | Activation of Catalysts-(Temperature Effect)[a] | | | |
|---|---|---|---|---|
| Temp., °C. | Time, hrs. | Catalyst Activity | Waxy, % | $C_7$-Insol., % |
| 100 | 0.5 | 47.0 | 5.3 | 91.9 |
| 150 | 0.5 | 50.0 | 2.7 | 95.6 |
| 100[b] | 1.0 | 47.5 | 2.1 | 95.7 |
| 150[b] | 1.0 | 49.7 | 1.6 | 97.3 |
| 100 | 2.0 | 49.4 | 3.8 | 93.6 |
| 150 | 2.0 | 48.5 | 1.0 | 97.7 |

[a]Activation Conditions: 10 gms. catalyst per 100 cc benzene solvent; 1AlEt$_2$Cl:1TiCl$_4$ mole ratio.
[b]A different TiCl$_3$·AlCl$_3$ catalyst was used in these experiments.

As can be seen from the above Table II, activation at 150° C. is better than activation at 100°C. Thus, not only is catalyst activity increased after activation at 150°C., but also a decrease in the amount of waxy polymer obtained is achieved at 150°C. activation temperatures. The extension of the treatment beyond a certain minimal time does not appear to be a contributing factor. Indeed, when the time of treatment is excessive in length, some decrease in catalyst activity is observed.

EXAMPLE 3

In order to demonstrate that the unique and novel effect observed with the process of the invention is not due just to solvent activity itself, but is caused by a special combination of solvent activity and temperature, a series of runs was carried out at different temperatures, but for the same time interval, using benzene as the activation medium and heptane as the polymerization diluent. The results are summarized below in Table III.

TABLE III

| | Aging Catalysts Below and Above Boiling Point of Benzene[a] | | | |
|---|---|---|---|---|
| Temp. °C | Time, hrs. | Catalyst Activity | Waxy, % | $C_7$ Insolubles, % |
| Control | — | 39 | 4.5 | 92.7 |
| 25 | 1 | 36.7 | 3.6 | 93 |
| 50 | 1 | 38.3 | 4.2 | 92.6 |
| 80 | 1 | 45.1 | 3.2 | 93.6 |
| 100 | 1 | 47.2 | 5.1 | |
| 150[b] | 1 | 49.7 | 1.6 | 97.3 |

[a]Activation Conditions: 10 gms. catalyst per 100 cc benzene solvent; 1AlEt$_2$Cl:1TiCl$_4$ mole ratio.
[b]Different TiCl$_3$·AA catalyst.

As can be seen from the above Table III experiments, catalyst activity increases as temperature increases. Thus, catalyst samples which were aged at 25° and 50°C. exhibited essentially no improvement. But, samples which were aged above 78°C. started to show an improvement and when aged at 150° were at the peak of activity.

EXAMPLE 4

A series of experiments was carried out in order to ascertain the effect of increasing the time of activation utilizing different temperatures. The results are summarized below in Table IV.

TABLE IV

| | Activation of Catalyst (Heating Time Effect)* | | | |
|---|---|---|---|---|
| Heating Time hrs. | Temp., °C. | Catalyst Activity | Waxy Polymer, % | $C_7$ Insolubles, % |
| 0.5 | 100 | 47.0 | 5.3 | 91.9 |
| 1.0 | 100 | 47.2 | 5.1 | |
| 2.0 | 100 | 49.4 | 3.8 | 93.6 |
| 0.25 | 150 | 50.4 | 1.3 | 96.7 |
| 0.5 | 150 | 50.0 | 2.7 | 95.6 |
| 2.0 | 150 | 48.5 | 1.0 | 97.7 |
| Control | | | | |
| — | — | 39.0 | 4.5 | 92.7 |

*Activation Conditions: 10 gms of catalyst per 100 cc of benzene solvent; 1AlEt$_2$Cl:1TiCl$_4$ mole ratio.

As can be seen from the above Table IV, at lower temperatures longer activation times directionally increase activity, whereas at the preferred temperatures, i.e. 150°C. activation can reach a maximum point after a very short time. Little advantage is obtained from continuing heat treatment beyond the minimum time period, and indeed some deterioration in activity can occur when excessively long time periods are used.

EXAMPLE 5

TABLE VI

| AlET$_2$Cl:TiCl$_4$, Mole Ratio | Activation of Catalysts (Reducing Agent Effect)[a] | | | | |
|---|---|---|---|---|---|
| | Temperature, °C. | Heating Time, hrs. | Catalyst Activity | Waxy Polymer, % | C$_7$-Insolubles, % |
| 0 | 100 | 0.5 | 50.3 | 2.9 | 95.1 |
| 20 | 100 | 0.5 | 49.4 | 4.3 | N.A. |
| 40 | 100 | 0.5 | 49.5 | 4.2 | 92.5 |
| 0 | 100 | 1 | 50.3 | 2.9 | 94.1 |
| 10 | 100 | 1 | 47.2 | 5.1 | |
| 0[b] | 100 | 1 | 51.2 | 2.5 | 95.8 |
| 10[b] | 100 | 1 | 47.5 | 2.1 | 95.7 |
| 10 | 150 | 1 | 49.7 | 1.6 | 97.3 |
| 20 | 150 | 1 | 51.2 | 2.0 | 96.7 |

[a]Activation Conditions: 10 gms of catalyst per 100 cc of benzene solvent.
[b]Different TiCl$_3$·AlCl$_3$ catalyst.

A series of experiments was carried out in order to determine whether or not it is necessary to agitate the catalyst while activation is occurring. The results of these tests are summarized below in Table V.

TABLE V

| Stirred Suspension | Activation of Catalysts-Agitation Effect* | | | |
|---|---|---|---|---|
| | Temp. °C. | Catalyst Activity | Waxy Polymer, % | C$_7$-Insolubles, % |
| No | 100 | 42.1 | 3.2 | 93.9 |
| Yes | 100 | 47.0 | 5.3 | 91.9 |
| No | 150 | 50.4 | 3.8 | 94.6 |
| Yes | 150 | 50.0 | 2.7 | 95.6 |
| Control | — | 39.0 | 4.5 | 92.7 |

*Activation Conditions: 10 gms of catalyst per 100 cc of benzene solvent; 0.5 hr. heating time; 1AlEt$_2$Cl:1TiCl$_4$ mole ratio.

As can be seen from the above Table V, stirring at the lower range temperatures of activation is beneficial. Whereas, at the preferred temperatures stirring does not contribute any measurable effect. But if the bed of catalyst cake is so large that diffusion limitations prevent the fresh activating solvent from entering the catalyst cake. And the activating solvent — TiCl$_4$ or activating solvent — AlCl$_3$ complex is prevented from leaving the catalyst cake, stirring is useful. Generally gentle stirring; enough to keep the catalyst suspended, is preferred.

Thus, it can be seen from Examples 4 and 5 above that when activation takes place at relatively low temperatures, i.e., 100°C., stirring and longer times directionally tend to improve the catalyst activity. But superior results can usually be obtained without stirring or long holding periods, when the temperature is maintained at 150°C. Probably this effect will be observed between from about 95° to 175°C.

EXAMPLE 6

Although the above experiments were carried out with various amounts of aluminum diethyl chloride present in the solvent treatment (to act as a scavenger it was thought), it has been subsequently found and is an important feature of the invention that the presence of the aluminum diethyl chloride contributes nothing to the activation, nor does it seem to interfere with the effectiveness of the activation treatment. In effect, it is inert.

Therefore, the basic invention herein is considered to be the activation of the catalyst by extracting titanium tetrachloride and/or AlCl$_3$ without utilization of aluminum diethyl chloride in the solvent. In order to demonstrate this point a series of activation runs with benzene were carried out. The results are summarized below in Table VI.

As can be seen from the above Table VI, the presence of the aluminum diethyl chloride has no noticeable effect on catalyst activity as opposed to the use of solvent without any aluminum diethyl chloride present. In fact, in one example the presence of the diethyl aluminum chloride appeared to have a slightly adverse effect.

EXAMPLE 7

A series of experiments were conducted in order to determine whether or not the catalyst concentration in heat soaking solvent influences the activation. The activating conditions were 150° for ¼ hour TiCl$_3$·⅓ AlCl$_3$ ball-milled catalyst in benzene. The results of these tests are summarized below in Table VII.

Table VII

| Catalyst Conc. | Weight 90 in Solvent Activity w/w | Heptane Insol., Wt. % |
|---|---|---|
| 5.4 | 50 | 96.5 |
| 7.5 | 49.2 | 96.0 |
| 10.2 | 31.5 | 94.7 |
| 18.5 | 31.3 | 95.4 |
| 25.4 | 32.5 | 95.5 |
| Control | 38 | 94.2 |

It is evident from this data that catalyst concentration must be kept below 15 wt %, preferably 7.5 wt. %. This depends on the solvent, for in the case of a solvent in which the solubility of trace poisons is lower, the optimum catalyst concentration may be below 7.5 wt. %.

EXAMPLE 8

In order to demonstrate additionally that the heat treatment is an exceedingly important and preferred facet of the invention, a comparison was made between the performance of identical benzene solvent treats differentiated only by the fact that in one case the catalyst was activated by heating and in the other simply by long term extraction. Results are summarized below in Table VIII.

Table VIII

| Catalyst Improvement by Heating or Extraction | | |
|---|---|---|
| | Heating | Extraction |
| Treatment Time, Hrs. | 0.01–0.5 | 2–3 |
| Pressure, psi(g) | 0–120 | 0 |
| Temperature, °C. | 80–175 | 78 |
| Catalyst Activity Increase, % | 20–30 | 10–20 |
| Waxy Polymer Decrease, % | 35–100 | 19 |
| % C$_7$-Insoluble Increase | 2.5%–4.5% | 1–2% |

As can be seen from the date in Table VII above, very significant improvements are obtained when the preferred technique of the invention is followed. Nevertheless, some lesser improvement is obtained with relatively long extraction times at relatively low temperatures.

EXAMPLE 9

In order to demonstrate the effect of activating by various types of heat-soaking in combination with ball-milling, a series of runs were carried out on ball-milled cocrystallized catalysts as described above in which various combinations of heat-soak-activation were utilized. The results are summarized below in Table IX.

Table IX

| Activated* | Ball Milled | Activated* | Cat. Act. | % Wax | % $C_7$ Insol. |
|---|---|---|---|---|---|
| — | Yes | — | 34.5 | 4.0 | 93.4 |
| — | Yes | Yes | 49.4 | 1.4 | 96.9 |
| Yes | Yes | — | 39.3 | 2.5 | 95.4 |
| Yes | Yes | Yes | 49.6 | 0 | 97.8 |

*Activated by heating as 5 wt. % slurry in Benzene at 150°C. for 1 hour.

As can be seen from the above data in Table IX, in every instance the use of heat-soak-activation demonstrates decided advantages as compared to omission of the heat-soak. Where a single heat-soak activation is utilized, the one following ball-milling is more effective. Yet a heat-soak before ball-milling is seen to be much more effective than omission of heat-soak altogether.

The use of heat-soaks both before ball-milling and after ball-milling (last example above) is seen to result in outstanding reduction of wax and improvement of $C_7$ insolubles.

EXAMPLE 10

A series of "split pre-treat catalysts" prepared by the reduction of $TiCl_4$ with aluminum diethylchloride were prepared and subjected to the standard activation treatment of this invention, e.g. 5 wt. % of benzene at 150°C. for 1 hour. The results are summarized below in Table X.

Table X

| Activated | Cat. Activity | % Wax | % $C_7$ Insol. |
|---|---|---|---|
| No | 28.5 | 7.4 | 89.5 |
| Yes | 28.0 | 4.5 | 91.5 |
| No | 19.5 | 3.0 | 92.6 |
| Yes | 20.8 | 2.2 | 93.7 |
| No | 15.5 | 4.7 | 90.6 |
| Yes | 22.5 | 5.8 | 90.8 |

The date above is shown for catalyst pairs, in which one reduced catalyst was activated and the other was not activated and used as the control. Thus there were three controls and three activations and each activation must be compared to its control. As can be seen from the above date some improvements could be effected in some of the examples utilizing the heat-treat activation technique. Nevertheless, it is to be recognized that the quantum of improvement is not nearly as marked as it is for the physically activated, e.g. ball-milled catalyst.

Although extensive reference herein has been made to catalysts which have been ball-milled or otherwise treated with sufficient physical energy to change the surface characteristics of the catalyst, it is pointed out that there is another important change that can occur when catalysts as described are subjected to the proper intensity of extreme physical energy, e.g. dry ball-milling by steel balls as pointed out in U.S. Pat. No. 3,032,510.

In that patent, it is taught that the dry ball-milling is carried out with sufficient severity to effect crystallographic changes in the resulting catalyst particles.

In the present invention, the solvent treatment can be effected either on catalysts which have not been physically activated with sufficient intensity to result in crystallographic changes or can be used on those catalysts which have been subjected to physical activation of sufficient intensity to effect crystallographic changes.

The latter are usually those which are commercially available and it is expected that the benefits of the invention will be particularly noticeable for those types of catalysts which have undergone crystallographic changes in addition to surface area changes. Such catalysts for example are available from Stauffer Chemical Company as Stauffer AA catalysts.

Moreover, the term ball-milled as used throughout this specification means "dry ball-milled" unless otherwise indicated.

An additional important feature of the invention herein is that the resulting polymer, e.g. polypropylene, has a novel crystallene structure. Thus, the unusually low amorphous content of polypropylene prepared with the catalysts of the invention results in crystal packings and densities not hitherto known to the art.

We claim:

1. A process for increasing the activity of a cocrystallized $TiCl_3 \cdot \frac{1}{3} AlCl_3$, obtained by aluminum reduction of $TiCl_4$, which is an already effective catalyst which comprises the sequential steps of dry ball milling and a heat soak treatment to remove trace quantities of materials detrimental to polymerization selected from the group consisting of: $TiCl_4$, $AlCl_3$ and combinations thereof from active catalyst sites of said catalyst by contacting said catalyst with an inert and selective solvent selected from the group consisting of benzene and heptane having a solvation affinity for said detrimental materials for ½ to 60 minutes and at a temperature of 100° to 160°C sufficient to result in a treated catalyst with increased activity, decreased waxy polymer and increased $C_7$-insolubles with respect to propylene polymerized with said treated catalyst, as compared to propylene polymerized with an identical catalyst that is untreated by the process hereof.

2. The process of claim 1 wherein said time is 10 to 35 minutes.

3. The process of claim 1 wherein said catalyst has been subjected to ball-milling sufficient to cause at least a three-fold increase in the surface area of said catalyst.

4. A process according to claim 1 wherein said process is carried out in a sealed vessel in order to utilize the high vapor pressures generated from said solvent at increased temperatures.

5. The process according to claim 3 wherein said solvent is benzene.

6. A process according to claim 1 wherein said solvent is heptane.

7. A process according to claim 1 wherein said heat soak is carried out both before and after said ball-milling.

8. A process according to claim 7 wherein said heat soaks are carried out in a sealed vessel in order to utilize the high pressures generated from said solvent at increased temperatures.

9. A process for further increasing the activity of a cocrystallized TiCl$_3$·⅓ AlCl$_3$ which has been dry ball-milled to initially increase its surface area from about 3 to 50 fold which comprises heat soaking from about 3 to 15 wt. % of said catalyst in a benzene solvent at a temperature of 100° to 160°C from 10 minutes to 35 minutes in a closed container and separating said solvent from said catalyst.

* * * * *